United States Patent
Flenniken et al.

(10) Patent No.: US 11,929,192 B2
(45) Date of Patent: Mar. 12, 2024

(54) POLYOLEFIN COMPOSITION FOR CABLE INSULATION

(71) Applicant: BASELL POLIOLEFINE ITALIA S.R.L., Milan (IT)

(72) Inventors: Cindy Flenniken, Houston, TX (US); Chun D. Lee, Houston, TX (US); Claudio Cavalieri, Ferrara (IT); Monica Galvan, Ferrara (IT); Vincent Baudier, Brussels (BE); Gisella Biondini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 788 days.

(21) Appl. No.: 16/965,794

(22) PCT Filed: Jan. 21, 2019

(86) PCT No.: PCT/EP2019/051323
§ 371 (c)(1),
(2) Date: Jul. 29, 2020

(87) PCT Pub. No.: WO2019/149549
PCT Pub. Date: Aug. 8, 2019

(65) Prior Publication Data
US 2021/0074447 A1    Mar. 11, 2021

Related U.S. Application Data

(60) Provisional application No. 62/625,870, filed on Feb. 2, 2018.

(30) Foreign Application Priority Data

Feb. 5, 2018    (EP) ..................... 18155038

(51) Int. Cl.
| | |
|---|---|
| *H01B 3/44* | (2006.01) |
| *C08K 5/14* | (2006.01) |
| *C08L 23/08* | (2006.01) |
| *C08L 23/12* | (2006.01) |
| *C08L 23/14* | (2006.01) |

(52) U.S. Cl.
CPC ............. *H01B 3/441* (2013.01); *C08K 5/14* (2013.01); *C08L 23/0815* (2013.01); *C08L 23/0853* (2013.01); *C08L 23/0869* (2013.01); *C08L 23/0892* (2013.01); *C08L 23/12* (2013.01); *C08L 23/14* (2013.01); *C08L 2203/20* (2013.01)

(58) Field of Classification Search
CPC . H01B 3/44; H01B 3/441; H01B 7/02; H01B 7/18; H01B 7/28; H01B 7/2806; H01B 7/2813; H01B 2/282; H01B 2/2825; C08K 5/14; C08L 23/0815; C08L 23/0853; C08L 23/0869; C08L 23/0892; C08L 23/12; C08L 23/14; C08L 2203/20
USPC ............... 174/110 R–110 PM, 117 R, 120 R
See application file for complete search history.

(56) References Cited

U.S. PATENT DOCUMENTS

| | | | |
|---|---|---|---|
| 4,018,852 A | 4/1977 | Schober | |
| 4,399,054 A | 8/1983 | Ferraris et al. | |
| 4,550,056 A * | 10/1985 | Pickwell | C08K 5/14 |
| | | | 428/375 |
| 5,346,961 A | 9/1994 | Shaw et al. | |
| 5,639,818 A * | 6/1997 | Lee | C08L 23/12 |
| | | | 525/227 |
| 2017/0210892 A1 * | 7/2017 | Douglas | C08K 5/134 |

FOREIGN PATENT DOCUMENTS

| | | | | |
|---|---|---|---|---|
| CN | 101341011 A | 1/2009 | | |
| CN | 101595176 A | 12/2009 | | |
| EP | 0045977 A2 | 2/1982 | | |
| EP | 0361493 A1 | 4/1990 | | |
| EP | 0728769 A1 | 8/1996 | | |
| EP | 2072576 A1 | 6/2009 | | |
| IT | WO 2016/207235 A1 * | 12/2016 | ............. | C08L 23/12 |
| IT | WO 2016/207236 A1 * | 12/2016 | ............. | C08L 23/16 |
| WO | 2010015876 A1 | 2/2010 | | |
| WO | 2012000885 A1 | 1/2012 | | |
| WO | 2016200600 A1 | 12/2016 | | |

OTHER PUBLICATIONS

International Search Report and Written Opinion dated May 2, 2019 (dated May 2, 2019) for Corresponding PCT/EP2019/051323.

* cited by examiner

*Primary Examiner* — William H. Mayo, III

(57) ABSTRACT

A cable article made from or containing a polyolefin composition made from or containing: (i) from 20.0 wt % to 80.0 wt % of component T1) being an interpolymer of ethylene and less than 7 wt %, of a polymerizable comonomer; (ii) from 0.5 wt % to 5.0 wt % of a peroxide; and (iii) from 20.0 wt % to 80.0 wt % of component T2). Component T2) is made from or contains: A) 5-35% by weight of a propylene homopolymer or a propylene ethylene copolymer; B) 20-50% by weight of a copolymer of ethylene and a $C_3$-$C_8$ alpha-olefin containing from 0.1% to 20% by weight of alpha-olefin units; and C) 30-60% by weight of a copolymer of ethylene and propylene containing from 25% to 75% by weight of ethylene units. The cable article is selected from the group consisting of cable insulation and cable jacketing.

10 Claims, No Drawings

POLYOLEFIN COMPOSITION FOR CABLE INSULATION

This application is the U.S. National Phase of PCT International Application PCT/EP2019/051323, filed Jan. 21, 2019, claiming benefit of priority to European Patent Application No. 18155038.5, filed Feb. 5, 2018, which claims benefit of priority to U.S. Provisional Application No. 62/625,870, filed Feb. 2, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a cable article made from or containing a cross-linked polyolefin composition.

BACKGROUND OF THE INVENTION

In many instances, crosslinked low-, medium-, and extra-high voltage power cables are made from low density polyethylene (LDPE). In some instances and to improve the properties of the cable, other polymers are added.

SUMMARY OF THE INVENTION

In a general embodiment, the present disclosure provides a cable article made from or containing a polyolefin composition made from or containing:

from 20.0 wt % to 80.0 wt % of component T1) being an interpolymer of ethylene and less than 7 wt %, of a polymerizable comonomer selected from the group consisting of unsaturated esters and hydrolyzable silane monomers;

from 0.5 wt % to 5.0 wt % of a peroxide; and from 20.0 wt % to 80.0 wt % of component T2) made from or containing A) 5-35% by weight of a propylene homopolymer or a propylene ethylene copolymer containing 90% by weight or more of propylene units; component A) containing 10% by weight or less of a fraction soluble in xylene at 25° C. ($XS_A$), both the amount of propylene units and of the fraction $XS_A$ being referred to the weight of A);

B) 20-50% by weight; of a copolymer of ethylene and a $C_3$-$C_8$ alpha-olefin containing from 0.1% to 20% by weight of alpha-olefin units and containing 25% by weight or less; of a fraction soluble in xylene at 25° C. ($XS_B$), both the amount of alpha-olefin units and of the fraction $XS_B$ being referred to the weight of (B); and C) 30-60% by weight of a copolymer of ethylene and propylene containing from 25% to 75% by weight of ethylene units and containing from 40% to 95% by weight of a fraction soluble in xylene at 25° C. ($XS_C$), both the amount of ethylene units and of the fraction $XS_C$ being referred to the weight of (C);

the amounts of (A), (B) and (C) being referred to the total weight of (A)+(B)+(C), the sum of the amount of (A)+(B)+(C) being 100, wherein the cable article is selected from the group consisting of cable insulation and cable jacketing.

DETAILED DESCRIPTION OF THE INVENTION

In a general embodiment, the present disclosure provides a cable article made from or containing a polyolefin composition made from or containing:

from 20.0 wt % to 80.0 wt % of component T1) being an interpolymer of ethylene and less than 7 wt %, alternatively less than 3 wt %, of a polymerizable comonomer selected from the group consisting of unsaturated esters and hydrolyzable silane monomers;

from 0.5 wt % to 5.0 wt % of a peroxide; and from 20.0 wt % to 80.0 wt % of component T2) made from or containing A) 5-35% by weight; alternatively 10-30% by weight; alternatively 15-23% by weight of a propylene homopolymer containing or a propylene ethylene copolymer containing 90% by weight or more, alternatively 95% by weight or more; alternatively 97% by weight or more of propylene units; component A) containing 10% by weight or less, alternatively 8 wt % or less; alternatively 6 wt % or less; alternatively 5% by weight or less, of a fraction soluble in xylene at 25° C. ($XS_A$), both the amount of propylene units and of the fraction $XS_A$ being referred to the weight of A);

B) 20-50% by weight; alternatively 25-45% by weight; alternatively 30-40% by weight of a copolymer of ethylene and a $C_3$-$C_8$ alpha-olefin containing from 0.1% to 20% by weight; alternatively from 5% to 15% by weight; alternatively from 7% to 12% by weight of alpha-olefin units and containing 25% by weight or less; alternatively from 20% by weight or less; alternatively 17% by weight or less of a fraction soluble in xylene at 25° C. ($XS_B$), both the amount of alpha-olefin units and of the fraction $XS_B$ being referred to the weight of (B); and C) 30-60% by weight; alternatively 35-55% by weight; alternatively 40-50% by weight of a copolymer of ethylene and propylene containing from 25% to 75% by weight; alternatively from 37% to 65% by weight; alternatively from 45% to 58% by weight of ethylene units and containing from 40% to 95% by weight of a fraction soluble in xylene at 25° C. ($XS_C$), both the amount of ethylene units and of the fraction $XS_C$ being referred to the weight of (C);

the amounts of (A), (B) and (C) being referred to the total weight of (A)+(B)+(C), the sum of the amount of (A)+(B)+(C) being 100, wherein the cable article is selected from the group consisting of cable insulation and cable jacketing.

In some embodiments, component (A) is a propylene homopolymer. In some embodiments, component (A) is a propylene homopolymer containing 5% by weight or less of a fraction soluble in xylene at 25° C. ($XS_A$). In some embodiments, component (A) has a melt flow rate (230° C./2.16 kg) ranging between 50 and 200 g/10 min; alternatively between 80 and 170 g/10 min.

In some embodiments, components (A)+(B) blended together have a melt flow rate (230° C./2.16 kg) between 0.1 and 70 g/10 min. alternatively between 1 and 50 g/10 min; alternatively between 8 and 40 g/10 min.

In some embodiments, component B) has a density (determined according to ISO 1183 at 23° C.) of from 0.940 to 0.965 g/cm³. Component B) is an ethylene copolymer containing $C_3$-$C_8$ alpha-olefin derived units. In some embodiments, the alpha-olefin comonomers are selected from the group consisting of propylene, 1-butene, 1-pentene, 4-methyl-1-pentene, 1-hexene and 1-octene; alternatively, 1-butene 1-hexene and 1-octene; alternatively, 1-butene.

In some embodiments, the component T2) has a melt flow rate (230° C./2.16 kg) between 0.5 to 25 g/10 min, alternatively from 0.8 to 20.0 g/10 min; alternatively from 1.0 to 18.0 g/10 min.

In some embodiments, the component T2) has an intrinsic viscosity [η] (measured in tetrahydronaphthalene at 135° C.)

of the xylene soluble fraction at 25° C. between 1.5 to 4.0 dl/g; alternatively between 2.0 and 3.5 dl/g; alternatively between 2.1 and 2.8 dl/g.

As used herein, the term "copolymer" refers to polymers containing two kinds of comonomers such as propylene and ethylene or ethylene and 1-butene.

In some embodiments, the component T2) is prepared by a sequential polymerization, including at least three sequential steps, wherein components (A), (B) and (C) are prepared in separate subsequent steps, operating in each step, except the first step, in the presence of the polymer formed and the catalyst used in the preceding step. In some embodiments, the catalyst is added in the first step and not in subsequent steps. In some embodiments, the catalyst remains active for the subsequent steps.

In some embodiments, the polymerization is selected from continuous or batch processes. In some embodiments, the polymerization is carried out in liquid phase, in gas phase, or by mixed liquid-gas techniques. In some embodiments, the polymerization is carried out in the presence of inert diluent. In some embodiments, the polymerization is carried out in the absence of inert diluent. In some embodiments, the polymerization is carried out in gas phase.

In some embodiments, the reaction temperature is from 50 to 100° C. In some embodiments, the reaction pressure is atmospheric or higher.

In some embodiments, the regulation of the molecular weight is carried out by molecular weight regulators. In some embodiments, the molecular weight regulator is hydrogen.

In some embodiments, the polymerizations are carried out in the presence of a Ziegler-Natta catalyst. In some embodiments, a Ziegler-Natta catalyst is made from or contains the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected from compounds of Ti, V, Zr, Cr and Hf. In some embodiments, the transition metal is supported on $MgCl_2$.

In some embodiments, the catalysts are made from or contain the product of the reaction of the organometallic compound of group 1, 2 or 13 of the Periodic Table of elements, with a solid catalyst component made from or containing a Ti compound and an electron donor compound supported on $MgCl_2$.

In some embodiments, the organometallic compounds are aluminum alkyl compounds.

In some embodiments, the polymer composition B) is obtained by using a Ziegler-Natta polymerization catalyst, alternatively a Ziegler-Natta catalyst supported on $MgCl_2$, alternatively a Ziegler-Natta catalyst made from or containing the product of reaction of:
1) a solid catalyst component made from or containing a Ti compound and an electron donor (internal electron-donor) supported on $MgCl_2$;
2) an aluminum alkyl compound (cocatalyst); and, optionally,
3) an electron-donor compound (external electron-donor).

In some embodiments, the solid catalyst component (1) contains as electron-donor a compound selected from the group consisting of ethers, ketones, lactones, compounds containing N, P and/or S atoms, and mono- and dicarboxylic acid esters.

In some embodiments, the catalysts are selected from the catalysts described in U.S. Pat. No. 4,399,054 and European Patent No. 45977.

In some embodiments, the electron-donor compounds are selected from the group consisting of phthalic acid esters and succinic acid esters. In some embodiments, the electron-donor compound is diisobutyl phthalate.

In some embodiments, the succinic acid esters are represented by the formula (I):

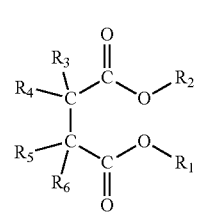

(I)

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms. In some embodiments, the radicals $R_3$ to $R_6$, which are joined to the same carbon atom, form a cycle.

In some embodiments, $R_1$ and $R_2$ are selected from the group consisting of $C_1$-$C_8$ alkyl, cycloalkyl, aryl, arylalkyl and alkylaryl groups. In some embodiments, $R_1$ and $R_2$ are selected from primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is a branched alkyl, cycloalkyl, aryl, arylalkyl and alkylaryl radical having from 3 to 10 carbon atoms. In some embodiments, at least two radicals from $R_3$ to $R_6$ are different from hydrogen and selected from $C_1$-$C_{20}$ linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, the at least two radicals different from hydrogen are linked to different carbon atoms, (a) $R_3$ and $R_5$ or (b) $R_4$ and $R_6$.

In some embodiments, other electron-donors are the 1,3-diethers, as described in published European Patent Application Nos. EP-A-361 493 and 728769.

In some embodiments, cocatalysts (2) are trialkyl aluminum compounds. In some embodiments, the trialkyl aluminum compounds are selected from the group consisting of Al-triethyl, Al-triisobutyl and Al-tri-n-butyl.

In some embodiments, the electron-donor compounds (3) used as external electron-donors (added to the Al-alkyl compound) are made from or containing aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine.

In some embodiments, the silicon compounds have the formula $R^1_aR^2_bSi(OR^3)_c$, where a and b are integer numbers from 0 to 2, c is an integer from 1 to 3 and the sum (a+b+c)

is 4; $R^1$, $R^2$ and $R^3$ are alkyl, cycloalkyl or aryl radicals with 1-18 carbon atoms optionally containing heteroatoms.

In some embodiments, the silicon compounds are selected from the group consisting of (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$.

In some embodiments, the 1,3-diethers are used as external donors. In some embodiments, when the internal donor is a 1,3-diether, the external donor is omitted.

In some embodiments, the catalysts are precontacted with small quantities of olefin (prepolymerization), maintaining the catalyst in suspension in a hydrocarbon solvent, and polymerizing at temperatures from room to 60° C., thereby producing a quantity of polymer from 0.5 to 3 times the weight of the catalyst.

In some embodiments, the operation takes place in liquid monomer, producing a quantity of polymer up to 1000 times the weight of the catalyst.

Component T1) is low density polyethylene (LDPE) and is an interpolymer of ethylene and less than 7 wt %, alternatively less than 3 wt %, of a polymerizable comonomer selected from the group consisting of unsaturated esters and hydrolyzable silane monomers.

In some embodiments, the LDPE is prepared high-pressure processes.

In some embodiments, the LDPE is a copolymer of ethylene and a polymerizable comonomer selected from the group consisting of unsaturated esters hydrolysable silane monomers. In some embodiments, these copolymers are prepared by high-pressure processes or post-reactor modification.

In some embodiments, the unsaturated esters are selected from the group consisting of alkyl acrylates, alkyl methacrylates, and vinyl carboxylates. In some embodiments, the alkyl groups have from 1 to 8 carbon atoms, alternatively from 1 to 4 carbon atoms. In some embodiments, the carboxylate groups have from 2 to 8 carbon atoms, alternatively from 2 to 5 carbon atoms.

In some embodiments, the acrylates and methacrylates are selected from the group consisting of ethyl acrylate, methyl acrylate, methyl methacrylate, t-butyl acrylate, n-butyl acrylate, n-butyl methacrylate, and 2-ethylhexyl acrylate.

In some embodiments, the vinyl carboxylates are selected from the group consisting of vinyl acetate, vinyl propionate, and vinyl butanoate.

In some embodiments, hydrolyzable silane monomers copolymerize with an olefin, or graft to and crosslink an olefin polymer. In some embodiments, the olefin is ethylene. In some embodiments, the olefin polymer is an ethylene polymer. In some embodiments, the hydrolyzable silane monomers have formula (I):

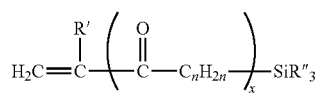

(I)

wherein R' is a hydrogen atom or methyl group; x is 0 or 1; n is an integer from 1 to 12, alternatively from 1 to 4, and each R" independently is a hydrolyzable organic group. In some embodiments, the hydrolyzable organic group is selected from the group consisting of an alkoxy group having from 1 to 12 carbon atoms, an aryloxy group, an aralnoxy group, an aliphatic acyloxy group having from 1 to 12 carbon atoms, an amino or substituted amino group, or a lower-alkyl group having 1 to 6 carbon atoms, with the proviso that not more than one of the three R" groups is an alkyl. In some embodiments, the alkoxy group having from 1 to 12 carbon atoms is selected from the group consisting of methoxy, ethoxy, and butoxy. In some embodiments, the aryloxy group is phenoxy. In some embodiments, the aralnoxy group is benzyloxy. In some embodiments, the aliphatic acyloxy group having from 1 to 12 carbon atoms is selected from the group consisting of formyloxy, acetyloxy, and propanoyloxy. In some embodiments, the amino group is an alkylamino or arylamino. In some embodiments, the silanes are copolymerized with ethylene in a a high-pressure process. In some embodiments, the silanes are grafted to an ethylene polymer by an organic peroxide. In some embodiments, the silanes are unsaturated silanes made from or containing an ethylenically unsaturated hydrocarbyl group and a hydrolyzable group. In some embodiments, the unsaturated hydrocarbyl group is a vinyl, allyl, isopropenyl, butenyl, cyclohexenyl or gamma (meth)acryloxy allyl group. In some embodiments, the hydrolyzable group is a hydrocarbyloxy, hydrocarbonyloxy, or hydrocarbylamino group. In some embodiments, the hydrolyzable groups are selected from methoxy, ethoxy, formyloxy, acetoxy, proprionyloxy, and alkyl or arylamino groups. In some embodiments, the silanes are unsaturated alkoxy silanes graftable onto the polymer or copolymerizable in-reactor with other monomers. In some embodiments, the other monomers are selected from the group consisting of ethylene and acrylates. In some embodiments, the hydrolyzable silane monomers are selected from the group consisting of vinyltrimethoxysilane (VTMS), vinyltriethoxysilane (VTES), vinyltriacetoxysilane, and gamma-(meth)acryloxy propyl trimethoxy silane.

In some embodiments, the LDPE has a melt index (h) from 0.1 to 100 grams per 10 minutes (g/10 min), measured at 190° C./2.16 kg, alternatively from 0.3 to 100 g/10 min, alternatively from 0.5 to 30 g/10 min, alternatively 1.0 to 10 g/10 min.

In some embodiments, the LDPE has a density greater than or equal to 0.910, alternatively greater than or equal to 0.914, alternatively greater than or equal to 0.916 grams per cubic centimeter (glee or g/cm3).

In some embodiments, the LDPE has a density from 0.910 to 0.940, alternatively from 0.915 to 0.935, alternatively from 0.916 to 0.932 g/cc.

In some embodiments, the peroxide is selected from the group consisting of dicumyl peroxide; bis(alpha-t-butyl peroxyisopropyl)benzene; isopropylcumyl t-butyl peroxide; t-butylcumyl peroxide; di-t-butyl peroxide; 2,5-bis(t-butyl peroxy)2,5-dimethylhexane; 2,5-bis(t-butyl peroxy)2,5-dimethylhexane-3; 1,1-bis(t-butyl peroxy)3,3,5-trimethylcyclo-hexane; isopropylcumyl cumylperoxide; di(isopropylcumyl) peroxide; and mixtures thereof. In some embodiments, the peroxide curing agents are used in amounts of at least 0.5 wt % based on the weight of the composition. In some embodiments, the peroxide curing agent is used in an amount of 0.5-10, alternatively 0.7-5 or 1-3 wt %, based on the weight of the composition. In some embodiments, the peroxides are used alone. In some embodiments, the peroxides are used in combination with other curing co-agents, boosters, and retarders. In some embodiments, the co-agents are selected from the group consisting of triallyl isocyanurate; ethoxylated bisphenol A dimethacrylate; a-methyl styrene dimer (AMSD). In some embodiments, the co-agents are selected from the co-agents disclose in U.S. Pat. Nos. 5,346,961 and 4,018,852.

The following examples are given in order to illustrate, but not limit the present disclosure.

EXAMPLES

Characterizations

Xylene-Soluble Faction at 25° C. (XS or Xs)

The Xylene Soluble fraction was measured according to ISO 16152, 2005, but with the following deviations (within parentheses is that which was prescribed by the ISO 16152).

The solution volume was 250 ml (200 ml).

During the precipitation stage at 25° C. for 30 min, the solution, for the final 10 minutes, was kept under agitation by a magnetic stirrer (30 min, without any stirring at all).

The final drying step was done under vacuum at 70° C. (100° C.).

The content of the xylene-soluble fraction was expressed as a percentage of the original 2.5 grams and then, by difference (complementary to 100), the xylene insoluble %.

XS of components B) and C) were calculated by using the formula;

$$XS_{tot} = WaXS_A + WbXS_B + WcXS_C$$

wherein Wa, Wb and Wc were the relative amount of components A, B and C (A+B+C=1).

Melt Flow Rate (MFR)

Measured according to ISO 1133 at 230° C. with a load of 2.16 kg, unless otherwise specified.

Intrinsic Viscosity IV

The sample was dissolved in tetrahydronaphthalene at 135° C. and then poured into a capillary viscometer. The viscometer tube (Ubbelohde type) was surrounded by a cylindrical glass jacket; this setup allowed temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine [η].

Comonomer (Ethylene (C2) and 1-Butene (C4)) Content

Comonomer ($C_2$ and $C_4$) Content

The content of comonomers was determined by infrared spectroscopy by collecting the IR spectrum of the sample vs. an air background with a Fourier Transform Infrared spectrometer (FTIR). The instrument data acquisition parameters were:

purge time: 30 seconds minimum
collect time: 3 minutes minimum
apodization: Happ-Genzel
resolution: 2 $cm^{-1}$.

Sample Preparation—Using a hydraulic press, a thick sheet was obtained by compression molding about 1 g of sample between two aluminum foils. A small portion was cut from the resulting sheet to mold a film. The film thickness was set to have a maximum absorbance of the $CH_2$ absorption band at ~720 $cm^{-1}$ of 1.3 a.u. (% Transmittance>5%). Molding conditions were a temperature of 180±10° C. (356° F.) and a pressure of around 10 $kg/cm^2$ (142.2 PSI) for about one minute. The pressure was then released. The sample was removed from the press and cooled to room temperature. The spectrum of pressed film sample was recorded in absorbance vs. wavenumbers ($cm^{-1}$). The following measurements were used to calculate ethylene ($C_2$) and 1-butene ($C_4$) contents:

a) Area ($A_t$) of the combination absorption bands between 4482 and 3950 $cm^{-1}$ which was used for spectrometric normalization of film thickness.

b) Area ($A_{C2}$) of the absorption band due to methylenic sequences ($CH_2$ rocking vibration) in the range of 660 to 790 $cm^{-1}$ after a proper digital subtraction of an isotactic polypropylene (IPP) and a $C_2C_4$ references spectrum.

c) The factor of subtraction ($FCR_{C4}$) between the spectrum of the polymer sample and the $C_2C_4$ reference spectrum. The reference spectrum was obtained by digital subtraction of a linear polyethylene from a $C_2C_4$ copolymer to extract the $C_4$ band (ethyl group at ~771 cm-1).

The ratio $A_{C2}/A_t$ was calibrated by analyzing ethylene-propylene standard copolymers of reference compositions, as determined by NMR spectroscopy.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150).

To calculate the ethylene ($C_2$) and 1-butene ($C_4$) content, calibration curves were obtained by using reference samples with ethylene and 1-butene detected by $^{13}$C-NMR.

Calibration for ethylene—A calibration curve was obtained by plotting $A_{C2}/A_t$ versus ethylene molar percent (% C2 m), and the coefficients $a_{C2}$, $b_{C2}$ and $c_{C2}$ were then calculated from a "linear regression".

Calibration for 1-butene—A calibration curve was obtained by plotting $FCR_{C4}/A_t$ versus butane molar percent (% $C_4$ m) and the coefficients $a_{C4}$, $b_{C4}$ and $C_{C4}$ were then calculated from a "linear regression".

The spectra of the evaluated samples were recorded and then ($A_t$), ($A_{C2}$) and ($FCR_{C4}$) were calculated.

The ethylene content (% molar fraction C2 m) of the sample was calculated as follows:

$$\% \, C2m = -b_{C2} + \frac{\sqrt{b_{C2}^2 - 4 \cdot a_{C2} \cdot \left(c_{C2} - \frac{A_{C2}}{A_t}\right)}}{2 \cdot a_{C2}}$$

The 1-butene content (% molar fraction C4 m) of the sample was calculated as follows:

$$\% \, C4m = -b_{C4} + \frac{\sqrt{b_{C4}^2 - 4 \cdot a_{C4} \cdot \left(c_{C4} - \frac{FCR_{C4}}{A_t}\right)}}{2 \cdot a_{C4}}$$

$a_{C4}$, $b_{C4}$, $c_{C4}$ $a_{C2}$, $b_{C2}$, $c_{C2}$ were the coefficients of the two calibrations.

Changes from mol % to wt % were calculated by using molecular weights of the compounds.

Amount (wt %) of comonomer of components A-C were calculated by using the following relationship;

$$Com_{tot} = WaCom_A + WbCom_B + WcCom_C$$

wherein Wa, Wb and We were the relative amount of components A, B and C (A+B+C=1)

Comtot, ComA, ComB, ComC were the amounts of comonomer in the composition (tot) and in components A-C.

Determination of the Haze

Films with a thickness of 50 μm were prepared by extruding each composition in a single screw Collin extruder (length/diameter ratio of screw 1:25) at a film drawing speed of 7 m/min and a melt temperature of 210-250° C.

50 μm film specimens were used. The haze value was measured using a Gardner photometric unit connected to a Hazemeter type UX-10 or an equivalent instrument having G.E. 1209 light source with filter "C". Reference samples were used for calibrating the instrument.

Examples 1—Preparation of Component T2)

Catalyst Precursor

The solid catalyst component used in polymerization was a Ziegler-Natta catalyst component supported on magnesium chloride, containing titanium and diisobutylphthalate as an internal donor. An initial amount of microspheroidal MgCl2.2.8C2H5OH was prepared according to the method described in Example 2 of U.S. Pat. No. 4,399,054 but operating at 3,000 rpm instead of 10,000. The resulting adduct was subjected to thermal dealcoholation at increasing temperatures from 30 to 130° C. in a nitrogen current until the molar alcohol content per mol of Mg is 1.16. Into a 1000 mL four-necked round flask, purged with nitrogen, 500 mL of TiCl4 were introduced at 0° C. While stirring, 30 grams of the microspheroidal MgCl2·1.16C2H5OH adduct were added. The temperature was raised to 120° C. and maintained for 60 minutes. During the temperature increase, an amount of diisobutylphthalate was added to produce a Mg/diisobutylphthalate molar ratio of 18. After the 60 minutes, stirring was stopped, the liquid was siphoned off, and the treatment with TiCl4 was repeated at 100° C. for 1 hour in the presence of an amount of diisobutylphthalate to produce a Mg/diisobutylphthalate molar ratio of 27. The stirring was stopped. The liquid was siphoned off, and the treatment with TiCl4 was repeated at 100° C. for 30 min. After sedimentation and siphoning at 85° C. the solid was washed six times with anhydrous hexane (6×100 ml) at 60° C.

Catalyst System and Prepolymerization

Before introducing the solid catalyst component into the polymerization reactors, the solid catalyst component was contacted at 30° C. for 9 minutes with aluminum triethyl (TEAL) and dicyclopentyldimethoxysilane (DCPMS), in a TEAL/DCPMS weight ratio equal to about 15 and in such quantity that the TEAL/solid catalyst component weight ratio was equal to 4.

The catalyst system was then subjected to prepolymerization by maintaining the catalyst system in suspension in liquid propylene at 50° C. for about 75 minutes before introducing the catalyst system into the first polymerization reactor.

Polymerization

The polymerization was carried out in continuous in a series of three gas-phase reactors equipped with devices to transfer the product from the first reactor to the second one. Into the first gas phase polymerization reactor a propylene-based polymer (A) was produced by feeding in a continuous and constant flow, the prepolymerized catalyst system, hydrogen (used as a molecular weight regulator) and propylene, with the components in a gas state. The propylene-based polymer (A) coming from the first reactor was discharged in a continuous flow and, after having been purged of unreacted monomers, is introduced, in a continuous flow, into the second gas phase reactor, together with quantitatively constant flows of hydrogen and ethylene, with the components in a gas state. In the second reactor a copolymer of ethylene (B) was produced. The product coming from the second reactor was discharged in a continuous flow and, after having been purged of unreacted monomers, was introduced, in a continuous flow, into the third gas phase reactor, together with quantitatively constant flows of hydrogen, ethylene and propylene, with the components in a gas state. In the third reactor an ethylene-propylene polymer (C) was produced. Polymerization conditions, molar ratio of the reactants and composition of the copolymers obtained are shown in Table 1. The polymer particles exiting the third reactor were subjected to a steam treatment to remove the reactive monomers and volatile substances, and then dried. Thereafter the polymer particles were mixed with a stabilizing additive composition in a twin screw extruder Berstorff ZE 25 (length/diameter ratio of screws: 34) and extruded under nitrogen atmosphere in the following conditions:

Rotation speed: 250 rpm;
Extruder output: 15 kg/hour;
Melt temperature: 245° C.

The stabilizing additive composition was made of the following components:

0.1% by weight of Irganox® 1010;
0.1% by weight of Irgafos® 168;
0.04% by weight of DHT-4A (hydrotalcite);

where the percent amounts refer to the total weight of the polymer and stabilizing additive composition.

The Irganox® 1010 was 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzenepropanoate while Irgafos® 168 was tris(2,4-di-tert.-butylphenyl)phosphite. The characteristics relating to the polymer composition, reported in Table 2, were obtained from measurements carried out on the extruded polymer, which constituted a stabilized ethylene polymer composition.

TABLE 1

| Polymerization conditions | | |
|---|---|---|
| Example | | 1 |
| 1$^{st}$ Reactor - component (A) | | |
| Temperature | ° C. | 60 |
| Pressure | barg | 16 |
| H$_2$/C$_3$- | mol. | 0.24 |
| Split | wt % | 22 |
| Xylene soluble of (A) (XS$_A$) | wt % | 4.2 |
| MFR of (A) | g/10 min. | 110 |
| 2$^{nd}$ Reactor - component (B) | | |
| Temperature | ° C. | 80 |
| Pressure | barg | 18 |
| H$_2$/C$_2$- | mol. | 0.81 |
| C$_4$-/(C$_2$- + C$_4$-) | mol. | 0.25 |
| C$_2$-/(C$_2$- + C$_3$-) | mol. | 0.98 |
| Split | wt % | 32 |
| C$_2$- content of B * | wt % | 90 |
| C$_4$- content of B * | wt % | 10 |
| Xylene soluble of B (XS$_B$) * | wt % | 16.0 |
| Xylene soluble of (A + B) | wt % | 12.0 |
| MFR of (A + B) | g/10 min. | 35.9 |

TABLE 1-continued

Polymerization conditions

| Example | | | 1 |
|---|---|---|---|
| 3rd Reactor - component (C) | | | |
| Temperature | °C. | | 65 |
| Pressure | barg | | 18 |
| $H_2/C_2-$ | mol. | | 0.17 |
| $C_2-/(C_2- + C_3-)$ | mol. | | 0.42 |
| Split | wt % | | 46 |
| $C_2-$ content of C * | wt % | | 52 |
| Xylene soluble of (C) ($XS_C$) * | wt % | | 83 |

Notes:
C2- = ethylene (IR);
C3- = propylene (IR);
C4- = 1-butene (IR);
split = amount of polymer produced in the concerned reactor.
* Calculated values.

Cable Preparation

14 AWG solid Cu wire having 30 and 60 mil thick insulation was produced with the following composition. Wires were water bath cured (silane crosslinked) at 90° C. overnight.

TABLE 2

| | comp ex 1 | ex 2 | comp ex 3 | ex 4 |
|---|---|---|---|---|
| Material | 30 mil | 30 mil | 60 mil | 60 mil |
| AQ120000 | 48 | 48 | 48 | 48 |
| CM95583 | 7 | 7 | 7 | 7 |
| KM05583 | 5 | 5 | 5 | 5 |
| composition T1) | 0 | 40 | 0 | 40 |
| GA808091 | 40 | 0 | 40 | 0 |

AQ120000 was AQUATHENE AQ120000, an ethylene vinylsilane copolymer designed for use in low voltage, power cable applications.

GA808091 was PETROTHENE GA 808-091, a broad molecular weight, linear low density polyethylene resin designed for use as a base resin in wire and cable jacketing and insulations (both thermoplastic and crosslinked).

KM05583 Ambient Cure Catalyst masterbatch (MB)

The crush resistance of the wire obtained in Examples 1-4 were measured according to Reference Standard for Electrical Wires, Cables, and Flexible Cords:UL 1581 (2001) 620.

The crush resistance of the wires of examples 1-4 is reported in Table 3.

TABLE 3

| | comp ex 1 | ex 2 | comp ex 3 | ex 4 |
|---|---|---|---|---|
| Crush lbs load @yield | 2600 | 3200 | 4550 | 4850 |
| Crush lbs load @max | 2750 | 3200 | 4600 | 5000 |

What is claimed is:

1. A cable article comprising:
    a polyolefin composition comprising
    from 20.0 wt % to 80.0 wt % of component T1) being an interpolymer of ethylene and less than 7 wt %, of a polymerizable comonomer selected from the group consisting of unsaturated esters and hydrolyzable silane monomers;
    from 0.5 wt % to 5.0 wt % of a peroxide; and
    from 20.0 wt % to 80.0 wt % of component T2) comprising
    A) 5-35% by weight of a propylene homopolymer containing 5% by weight or less of a fraction soluble in xylene at 25° C. ($XS_A$), or a propylene ethylene copolymer containing 90% by weight or more of propylene units; containing 10% by weight or less of a fraction soluble in xylene at 25° C. ($XS_A$), both the amount of propylene units and of the fraction $XS_A$ being referred to the weight of A);
    B) 20-50% by weight; of a copolymer of ethylene and a $C_3$-$C_8$ alpha-olefin containing from 0.1% to 20% by weight of alpha-olefin units and containing 25% by weight or less; of a fraction soluble in xylene at 25° C. ($XS_B$), both the amount of alpha-olefin units and of the fraction $XS_B$ being referred to the weight of (B); and
    C) 30-60% by weight of a copolymer of ethylene and propylene containing from 25% to 75% by weight of ethylene units and containing from 40% to 95% by weight of a fraction soluble in xylene at 25° C. ($XS_C$), both the amount of ethylene units and of the fraction $XS_C$ being referred to the weight of (C);
    the amounts of (A), (B) and (C) being referred to the total weight of (A)+(B)+(C), the sum of the amount of (A)+(B)+(C) being 100,
    wherein the cable article is selected from the group consisting of cable insulation and cable jacketing.

2. The cable article according to claim 1, wherein in component T2:
    Component A ranges from 10% by weight to 30% by weight;
    Component B ranges from 25% by weight to 45% by weight; and
    Component C ranges from 35% by weight to 55% by weight.

3. The cable article according to claim 1, wherein in component T2)
    Component A ranges from 15% by weight to 23% by weight;
    Component B ranges from 30% by weight to 40% by weight; and
    Component C ranges from 40% by weight to 50% by weight.

4. The cable article according to claim 1, wherein in component T2) component A) is a propylene homopolymer.

5. The cable article according to claim 1, wherein in component T2) component B) is a copolymer of ethylene and a $C_3$-$C_8$ alpha-olefin containing from 5% to 15% by weight of alpha-olefin units.

6. The cable article according claim 1, wherein in component T2) component C) is a copolymer of ethylene and propylene containing from 37% to 65% by weight of ethylene units.

7. The cable article according to claim 1, wherein in component T2) component (A) has a melt flow rate (230° C./2.16 kg) ranging between 50 and 200 g/10 min.

8. The cable article according to claim 1, wherein in component T2) components (A)+(B) blended together have a melt flow rate (230° C./2.16 kg) ranging between 0.1 and 70 g/10 min.

9. The cable article according to claim 1, wherein component T1) is an interpolymer of ethylene and less than 3 wt%, of a polymerizable comonomer selected from the group consisting of unsaturated esters and hydrolyzable silane monomers.

10. The cable article according to claim 1, wherein component T1) is a copolymer of ethylene and a polymerizable comonomer selected from the group consisting of unsaturated esters and hydrolysable silane monomers.

\* \* \* \* \*